Jan. 29, 1935.  J. E. LILIENFELD  1,989,622
CONDENSER AND METHOD OF CONSTRUCTING THE SAME
Filed Aug. 29, 1931   2 Sheets-Sheet 1
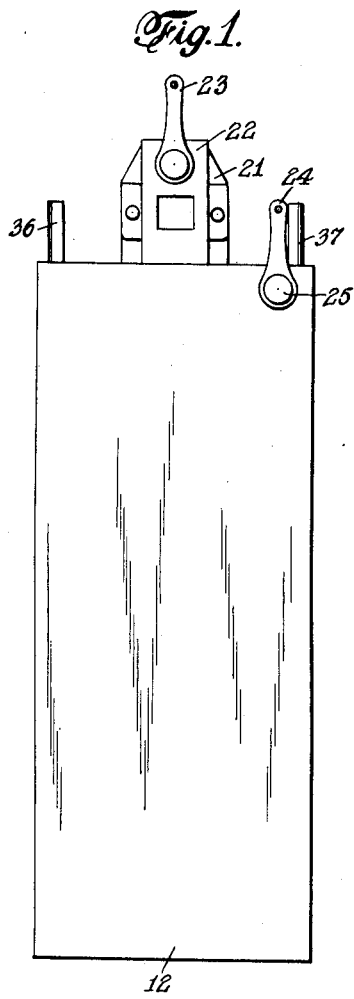
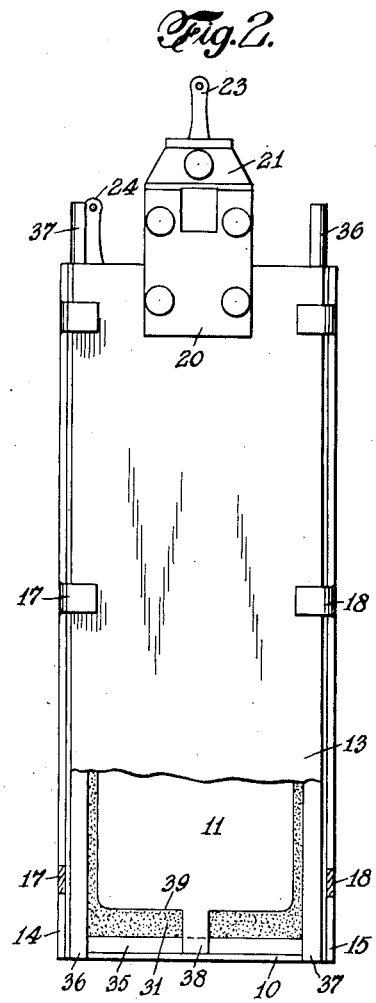
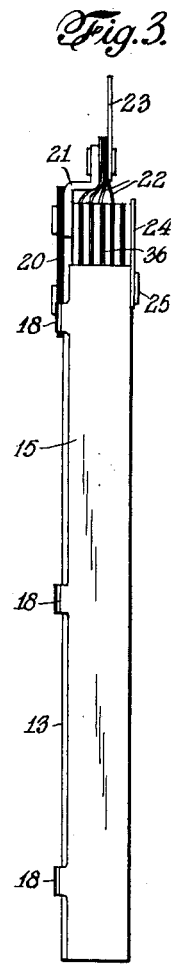
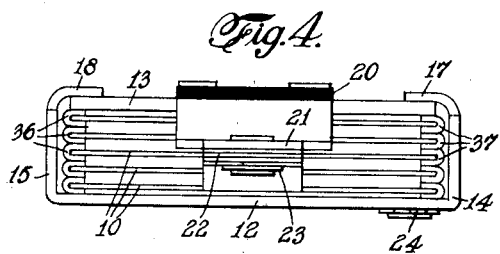
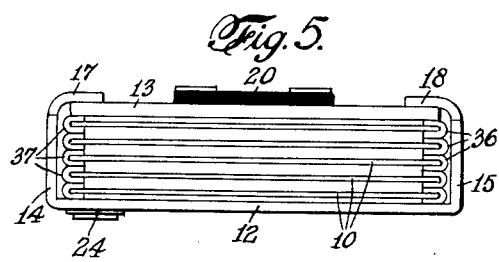
INVENTOR
JULIUS EDGAR LILIENFELD
BY
ATTORNEY

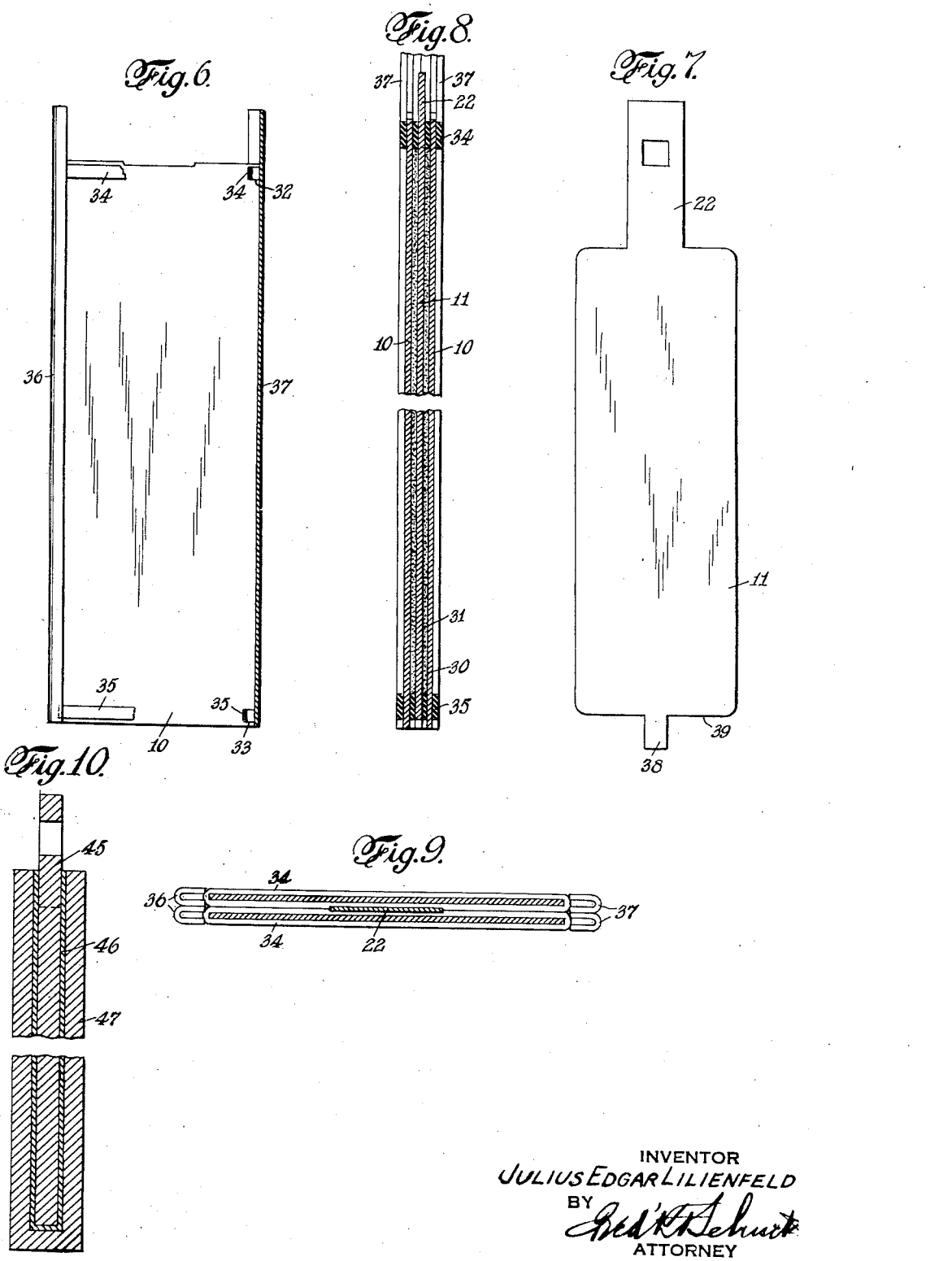

Patented Jan. 29, 1935

1,989,622

UNITED STATES PATENT OFFICE 1,989,622

CONDENSER AND METHOD OF CONSTRUCTING THE SAME

Julius Edgar Lilienfeld, Winchester, Mass., assignor to Ergon Research Laboratories, Inc., a corporation of Delaware Application August 29, 1931, Serial No. 560,142

8 Claims. (Cl. 175—315)

The invention relates to electrical condensers, and to a novel method of constructing the same.

It has for an object the application of a novel, substantially non-flowing, plastic medium between the electrodes of the condenser, for example, as an electrolyte.

Another object of the invention resides in an organization of elements providing a novel condenser of new and important characteristics.

A still further object of the invention resides in a novel construction of electrode elements for association with the aforesaid plastic medium and whereby the latter is retained within substantially sealed compartments. Another object of the invention resides in the provision of a coating over the ends of the compartments for further insuring the seal.

A still further object of the invention resides in the construction of means for maintaining the electrodes in assembled relationship, and in the provision of terminals.

A still further object of the invention resides in the provision of a novel form of condenser utilizing a plastic electrolyte and in which condenser the anodes may be preformed, that is to say, not formed in situ after the condenser has been assembled and in the partciular final electrolyte utilized therein.

Electrolytic condensers of the so-called "dry" type have heretofore been constructed of coiled electrode elements or of plates with a spacer of a reticular or porous material, the anode being formed in the condenser electrolyte after the condenser has been assembled. The solidification of the electrolyte after assembly of the condenser and formation of its anode has also been suggested. Where anodes have thus been formed after assembly, it was not possible to form a layer or film of superior quality, particularly where a strip of reticular or like material is utilized to hold the electrolyte to the electrodes.

Proper formation requires free circulation to prevent changes in concentration of the electrolyte, as well as to prevent gas bubbles adhering to the filmed electrodes, through rapid stirring during formation—all of which is impossible in the constructions heretofore utilized.

In accordance with the present invention, the anodic electrodes employed are first formed in a suitable electrolyte and apart from the final condenser structure, as in the best practice. The electrodes, preferably the cathodes, are then coated with a suitable plastic or highly viscous and more or less hygroscopic electrolyte of a substanially non-flowing nature. In this case, the formed anodes are located between pairs of coated cathode surfaces. It is feasible, also, to coat the anodes instead of the cathodes, or to have all electrodes, anodic as well as cathodic, coated. Thereafter the whole may be assembled between electrode holding means such as suitable end plates affording housing means and which means may carry also the respective terminals in manner hereinafter set forth. The construction and arrangement, furthermore, is such that the perimeter of the cathodes is provided with means to afford a more or less fluid-tight chamber between adjacent cathodes, when thus assembled, and wherein is retained the plastic electrolyte and a preformed anode. This anode, also, may comprise a filming metal with bilaminate integral coating molecularly associated therewith, the proximate layer constituting the active and dielectric layer and the outer layer being inactive and permeable to OH ions.

The nature of the invention, however, will best be understood when described in connection with the accompanying drawings, in which:

Fig. 1 illustrates the novel condenser in front elevation, and Fig. 2 in rear elevation, with portion broken away; while Fig. 3 is an end elevation thereof.

Figs. 4 and 5 are respectively a plan view and an underneath view of the condenser, and on an enlarged scale.

Fig. 6 is a front elevation of the cathode utilized in the novel condenser, with portions broken away and in section.

Fig. 7 is an elevation of the anode which may be utilized in the novel condenser.

Figs. 8 and 9 are respectively a vertical section and a transverse section through two cathodes and associated anode constituting a single cell of the condenser, and on an enlarged scale.

Fig. 10 is a transverse section, on an enlarged scale, through an anode and illustrates a modification in the film structure.

Referring to the drawings, the condenser electrodes, constituted by the plurality of cathodes 10 and intermediate anodes 11, are shown assembled or housed as by being mounted between two end plates 12 and 13. The former is in the nature of a channel member with sides 14 and 15 from which extend laterally securing or locking lugs 17 and 18, respectively. These lugs are intended to project inwardly over the other plate 13, firmly holding the various electrodes between said end plates 12 and 13 which thus constitute a suitable housing therefor, although I do not wish to be restricted to this particular means for holding the electrodes in assembled relationship, as other means for holding them together will readily suggest themselves.

A block or plate 20 of insulation may be rigidly secured to the holding means, for example, and to which in turn is rigidly attached a conducting element 21 for uniting thereto the various tabs 22 adapted to extend through the top of the condenser from the respective anodes. These tabs may be riveted to the said conducting element 21 to which is also riveted a terminal lug 23 for connection to the battery of anodes as when the condenser is adapted for single connection.

When it is to be utilized in sub-divisions of multiples of anodes, these may be suitably grouped, additional terminal elements (not shown) then being provided and properly offset or displaced.

Furthermore, a terminal lug 24 may be rigidly secured to the plate 12 as by riveting the same thereto at 25 for connection to the battery of cathodes.

In accordance with the invention, each pair of cathodic elements, as the cathodes 10, is specially constructed to afford therebetween a chamber 30 to receive a plastic medium or substantially non-flowing electrolyte 31, and, for example, of the nature more particularly set forth in my copending application for electrolytes, Serial No. 560,140, filed of even date herewith, and in my copending application Serial No. 711,286, filed February 14, 1934.

Such electrolyte may comprise the highly viscous hygroscopic condensation product of an alcohol such as a glycol (triethylene glycol), or compounds thereof, with a weak mineral or organic acid, such as boric acid, the polymerization being effected preferably in the presence of a catalyst, such as zinc chloride. To this is to be mixed a suitable filler, such as lamp black, aluminum dust, copper dust, etc. to render it more plastic and/or reduce its resistance. Other non-conducting fillers like dust of regenerated or not regenerated cellulose (cotton dust), diatomaceous earth, etc. may be used, as is also set forth more particularly in my aforesaid application.

This electrolyte 31 may be made of a consistency such as to be readily and conveniently spread or sprayed upon the cathode surfaces to coat the same and to be retained thereon during the assembly of the condenser, it being understood that an anode 11 is inserted in the chamber 30 between two adjacently disposed coated cathode surfaces. If desired, also, a cambric strip or other retiform material (not shown) may be interposed to better retain the plastic medium by retarding the flow thereof. Such fabric will also act as an insulator and as a means of preventing mechanical contact between electrodes.

In order to obtain this chamber and to prevent substantial outflow of the more or less fluid electrolyte therefrom, there is provided near the top and bottom edges of a cathode a pair of oppositely disposed notches 32 and a pair of notches 33, respectively, and in which rubber bands 34 and 35, respectively, are designed to be held under a slight tension.

These bands form upper and lower barriers of a more or less resilient nature, and side barriers or thickened edges are provided along the respective sides of the cathode as in the provision of channel or U-shape members 36 and 37, respectively, which are crimped over the said opposite side edges and the portions of the rubber bands within the respective notches. The bands are thus further secured against displacement, and by arranging one cathode alongside of the other with the channel elements 36, 37 thereof in contact, not only are the cathodes electrically interconnected thereby but a substantially sealed or leak-proof chamber 30 is provided between each pair of juxtaposed cathodes.

In this chamber, as aforesaid, an anode 11 is designed to be located with its tab 22 extending upwardly therethrough between contacting rubber band portions which fit securely around the same, to hold an anode, due to the resiliency of the rubber material. The chamber hereinbefore described is of a relatively sealed character, any small fissures or openings being clogged by the electrolyte. The said chamber, furthermore, may be made entirely so with respect to the retained medium as by coating the outer surface at the top and bottom of the condenser with a suitable substance of a somewhat hygroscopic nature or of a non-hygroscopic nature, such as "bakelite" varnish, collodion, "cellophane", rubber latex and rubber cement, etc. The use of these materials will prevent leaks in case the viscosity of the electrolyte should become somewhat reduced due to the generation of heat.

The location of the anode in a chamber may also be further insured by providing a lower tab 38 which extends from the bottom edge 39 of the anode and is adapted to fit between a corresponding pair of the lower rubber bands 35. When this lower tab is not utilized, the lower band 35 may be substituted by a metallic channel (not shown) to be provided over the lower edge of the side edges of the cathode as in the case of the side edges of the cathode.

I have found, furthermore, that it is of advantage to provide the anode, especially when the electrolyte embodies a filler of a conducting nature, with a novel form of film, or rather, double film. That is to say, the filming metal such as aluminum, selected for the anode 45, is formed in a novel manner to provide over its surface a bilaminate integral coating which is molecularly associated therewith—the proximate layer 46 constituting the usual active and dielectric film and the outer layer 47 being in the nature of a protective coating which is inactive and conductive to OH ions in the presence of water or an aqueous vapor. A particular characteristic of this novel bilaminate coating is its irreversibility in application, that is to say, the inactive layer cannot be imposed over the active film but must first be formed upon the filming metal, whereupon it is possible to underimpose the said active layer. For example, an anode may be formed to provide the inactive layer in $\frac{1}{10}$ normal phosphoric acid at a temperature of 30°–35° C. and at a current density of 5 m. a. per sq. cm., the formation requiring about one-half hour.

Before underimposing beneath this layer the active layer, the formed anode is thoroughly washed for 5 to 10 minutes in hot distilled water, whereupon formation is effected, for example, in an electrolyte consisting of boric acid with or without the addition of a small amount of sodium borate.

The original or inactive layer may, of course, be formed in other electrolytes, for example, in a 7% sulfuric acid solution at a temperature of 40°–45° C. and at a current density of 12 m. a. per sq. cm., or may be variously oxidized or etched, all of which is more fully set forth in my copending application for Filming metal coatings and method of producing the same, Serial No. 560,141, filed of even date herewith, and no claim is made herein specifically to this novel coating nor to the method of providing the same.

These bilaminate coatings are of especial value in condensers of the nature herein set forth, when the electrolyte itself constitutes also the medium for physically separating an anode from its adjacently disposed cathodes, to prevent mechanical injury of the dielectric active anode film.

The bilaminate coating also presents electrical advantages, for example, when a conducting filler, such as lamp black, is utilized to provide the electrolyte as a pasty mass suitable for retention between electrodes, such conducting filler lowers the sparking voltage of the condenser though reducing the power factor. However, by providing the bilaminate layer, hereinbefore described, the advantage of utilizing a conducting filler is retained without the disadvantage of lowering the sparking voltage which in some instances is very considerable, the breakdown voltage dropping from 700 volts to 430 volts upon admixture of the filler.

This may be accounted for by the following explanation. The bodily presence of the dust or filler particles upon the active layer disturbs the field of and also exerts a mechanical influence upon said layer. Therefore, by underimposing the active layer beneath the inactive stratum or layer, the filler material is unable to contact with the active layer and the objectionable facts hereinbefore noted are obviated.

I claim:

1. A condenser comprising a pair of cathodes, cooperating individual resilient insulating members mounted over at least one end of each cathode to space the same apart and afford a seal thereat, means cooperating with said members to afford a substantially sealed compartment between said cathodes, a plastic electrolyte within said compartment, and an anode therein and separated from mechanical contact with adjacent cathodes by said electrolyte, said anode extending beyond said compartment between said resilient insulating members but not otherwise.

2. A condenser comprising a pair of cathodes, resilient insulating sealing means about the ends of a cathode, sealing means about the edges of a cathode, said sealing means serving to separate the two cathodes to afford a substantially sealed compartment therebetween, a plastic electrolyte within said compartment, and an anode therein and extending through the insulating sealing means at one end.

3. A condenser comprising a pair of cathodes, insulating resilient sealing means about the ends of a cathode, metallic sealing means about the edges of a cathode, said metallic and resilient sealing means serving to separate the two cathodes to afford a substantially sealed compartment therebetween, a plastic electrolyte within said compartment, and an anode therein and extending through the resilient sealing means at one end.

4. A condenser comprising a pair of cathodes, insulating resilient sealing means about the ends of a cathode, metallic sealing means about the edges of a cathode, said metallic and resilient sealing means serving to separate the two cathodes to afford a substantially sealed compartment therebetween, a plastic electrolyte within said compartment, and an anode therein and extending through the resilient sealing means at one end and having a tab at the opposite end extending between the resilient sealing means thereat.

5. A condenser comprising cathodes notched at an end along opposite edges, resilient means held therein to extend transversely over an end of each cathode, means at the opposite side edges of each cathode to space adjacent cathodes apart to afford a substantially sealed compartment therebetween, a plastic electrolyte within each compartment, and an anode therein and separated from mechanical contact with adjacent cathodes by said electrolyte.

6. A condenser comprising cathodes notched at the top and bottom along opposite edges, rubber bands held therein to extend transversely over the ends of each cathode, metal channels crimped over the opposite side edges of each cathode to space adjacent cathodes apart to afford a substantially sealed compartment therebetween, a plastic electrolyte within each compartment, and an anode therein and separated from mechanical contact with adjacent cathodes by said electrolyte.

7. A condenser comprising two paired electrodes in opposed spaced relation, means carried by the edges of said paired electrodes spacing them apart and enclosing a substantially sealed compartment therebetween, at least one portion of said means being of insulating character, an interposed electrode within said compartment extending in part only through said means, at said insulating portion thereof, and spaced and insulated from said paired electrodes thereby, and a plastic electrolyte within said compartment between said interposed electrode and said paired electrodes preventing contact therebetween.

8. A condenser comprising two paired electrodes in opposed spaced relation; a spacing frame between said paired electrodes affording a substantially sealed compartment therebetween, at least one portion of said frame being of insulating and resilient character, a plastic electrolyte within the compartment, an interposed electrode within the compartment maintained in spaced relation to said paired electrodes by the electrolyte and extending in part only through said frame, at said insulating portion thereof, intermediate said paired electrodes.

JULIUS EDGAR LILIENFELD.